(12) United States Patent
Kuroshima

(10) Patent No.: US 8,780,392 B2
(45) Date of Patent: Jul. 15, 2014

(54) CLIENT APPARATUS, CONTROL METHOD THEREFOR, AND BOOKBINDING SYSTEM

(75) Inventor: Masashi Kuroshima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 300 days.

(21) Appl. No.: 13/293,797

(22) Filed: Nov. 10, 2011

(65) Prior Publication Data

US 2012/0120445 A1     May 17, 2012

(30) Foreign Application Priority Data

Nov. 15, 2010    (JP) .................................. 2010-255310

(51) Int. Cl.
*G06F 3/12*    (2006.01)

(52) U.S. Cl.
CPC ............ *G06F 3/1288* (2013.01); *G06F 3/1232* (2013.01); *G06F 3/1255* (2013.01); *G06F 3/1228* (2013.01); *G06F 3/1252* (2013.01); *G06F 3/1205* (2013.01)
USPC ........................... 358/1.15; 358/1.5; 358/1.12

(58) Field of Classification Search
USPC ........... 358/1.12, 1.13, 1.14, 1.15, 1.16, 1.18, 358/1.2, 1.3, 1.5
See application file for complete search history.

(56) References Cited

FOREIGN PATENT DOCUMENTS

| JP | 11-088648 A | 3/1999 |
| JP | 2006-180391 A | 7/2006 |
| JP | 2007-188154 A | 7/2007 |

OTHER PUBLICATIONS

Japanese Office Action issued in corresponding application No. 2010-255310 on Apr. 18, 2014.

*Primary Examiner* — Vu B Hang

(74) *Attorney, Agent, or Firm* — Carter, DeLuca, Farrell & Schmidt, LLP

(57) ABSTRACT

A client apparatus that receives document data and a job ticket from a server apparatus, and generates a print job for the document data, the client apparatus performs control such that, in a case where designation of a paper size is performed preceding designation of a paper type, a combination information piece that includes the paper size is extracted from the job ticket, and the paper type included in the extracted combination information piece is set as a paper type that is selectable, and in a case where designation of a paper type is performed preceding designation of a paper size, a combination information piece that includes the paper type is extracted from the job ticket, and the paper size included in the extracted combination information piece is set as a paper size that is selectable.

7 Claims, 21 Drawing Sheets

F I G. 6A
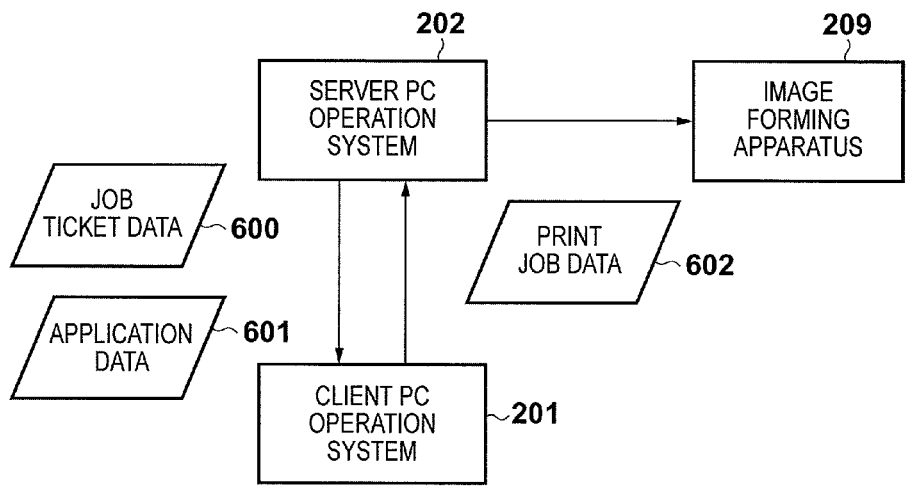
F I G. 6B
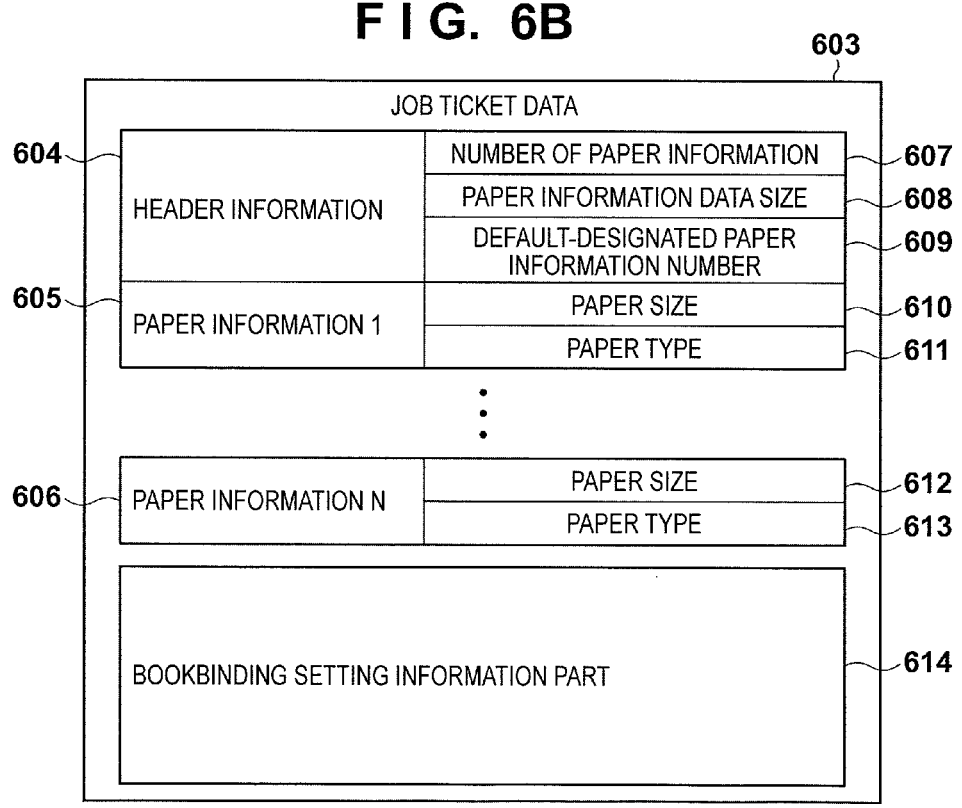

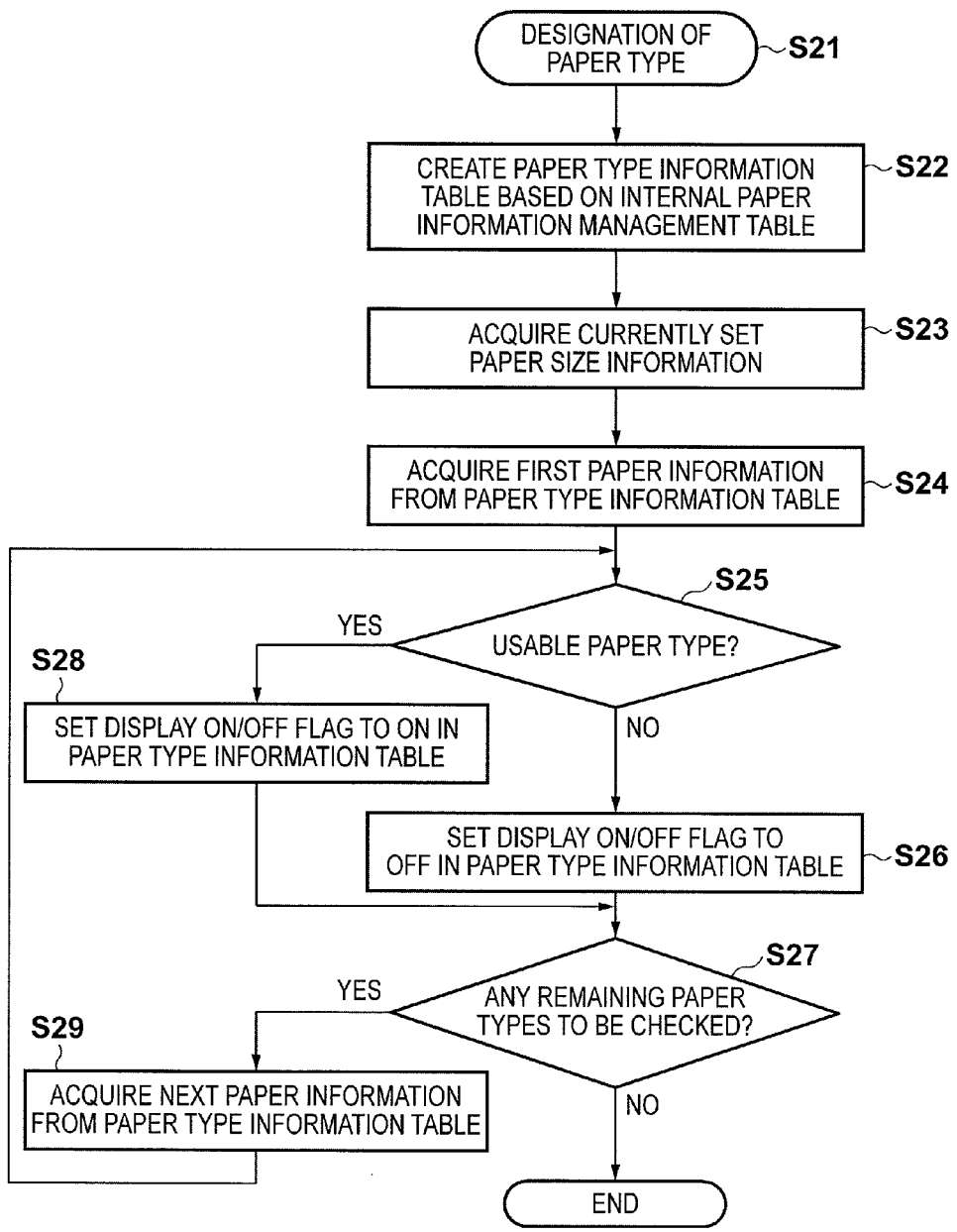
F I G. 15

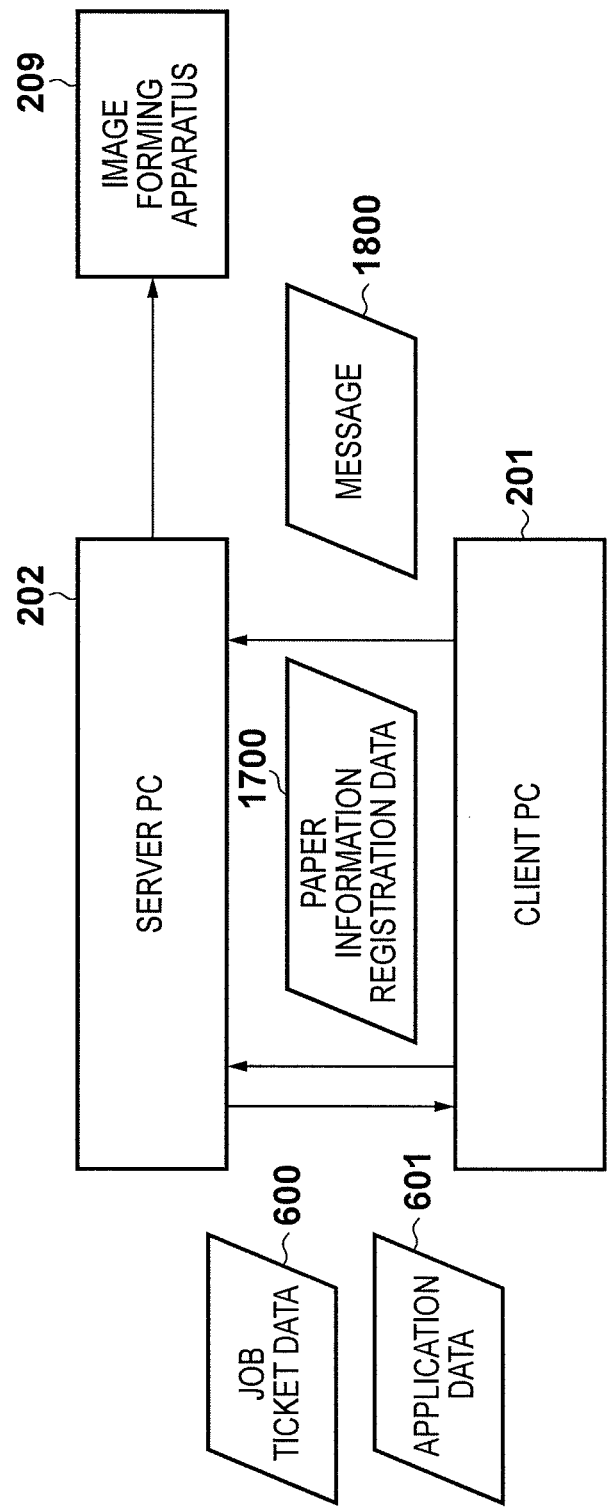

F I G. 18
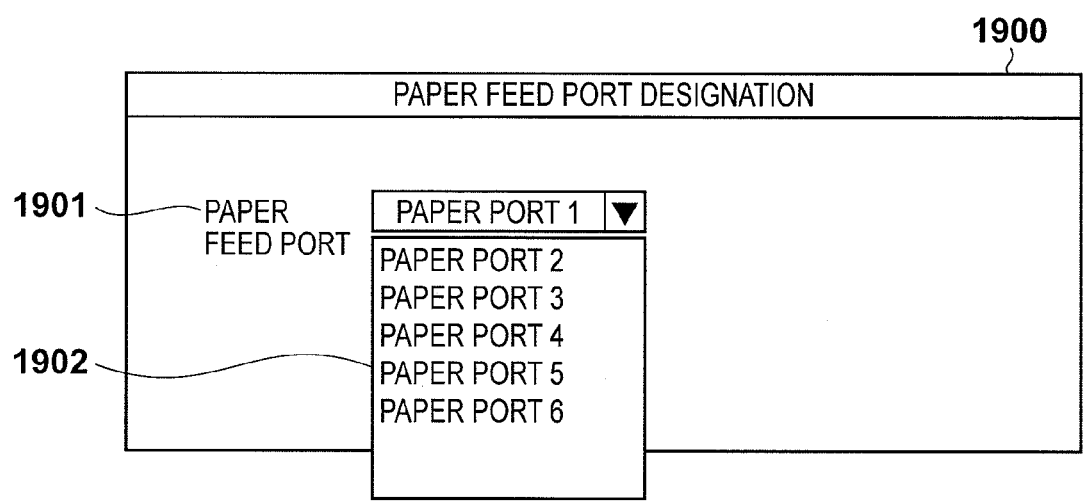

CLIENT APPARATUS, CONTROL METHOD THEREFOR, AND BOOKBINDING SYSTEM

BACKGROUND OF THE INVENTION

1. Field of the Invention

The present invention relates to cooperation processing technology used in a bookbinding system and, in particular, to cooperation processing technology used in a bookbinding setting.

2. Description of the Related Art

For facsimile (FAX) devices, a technique has been proposed in which a transmission-side device designates the size and type of printing paper on which a document is to be output, and a reception-side device prints out the document using printing paper of the designated size and type (for example, Japanese Patent Laid-open No. 11-088648).

However, for example, in a bookbinding system including a server apparatus and a client apparatus, if the respective apparatuses are configured to be able to independently designate paper size and paper type, problems such as the following will occur. Specifically, in a case where the client apparatus carries out bookbinding settings based on requests designated by the server apparatus, there are cases in which the client apparatus sets paper information other than that managed by the server apparatus. If the client apparatus sets a combination of paper size and paper type that is not managed by the server apparatus, normal print output cannot be obtained as a result.

SUMMARY OF THE INVENTION

According to one aspect of the present invention, a client apparatus that receives document data and a job ticket that includes one or more combination information pieces, each including a paper size and a paper type, from a server apparatus, and generates a print job for the document data, the apparatus comprises: a size designation unit configured to designate a paper size to be used to print out the document data received from the server apparatus; a type designation unit configured to designate a paper type to be used to print out the document data received from the server apparatus; and a control unit configured to perform control such that, in a case where designation of a paper size by the size designation unit is performed preceding designation of a paper type by the type designation unit, a combination information piece that includes the paper size designated by the size designation unit is extracted from among the one or more combination information pieces included in the job ticket, and the paper type included in the extracted combination information piece is set as a paper type that is selectable by the type designation unit, and in a case where designation of a paper type by the type designation unit is performed preceding designation of a paper size by the size designation unit, a combination information piece that includes the paper type designated by the type designation unit is extracted from among the one or more combination information pieces included in the job ticket, and the paper size included in the extracted combination information piece is set as a paper size that is selectable by the size designation unit.

According to another aspect of the present invention, a client apparatus that receives document data and a job ticket that includes one or more combination information pieces, each including a paper size and a paper type, from a server apparatus, and generates a print job for the document data, comprises: a size designation unit configured to select and designate a paper size to be used to print out the document data received from the server apparatus; a type designation unit configured to select and designate a paper type to be used to print out the document data received from the server apparatus; a determination unit configured to determine whether or not the one or more combination information pieces include a combination of the paper size designated by the size designation unit and the paper type designated by the type designation unit; a request unit configured to, in a case where it is determined that the one or more combination information pieces do not include the combination, request the server apparatus to register the combination; and a display unit configured to, in a case where information indicating that the combination requested by the request unit is not registerable is received from the server apparatus, perform display indicating that the combination is not registerable.

According to still another aspect of the present invention, a control method for a client apparatus that receives document data and a job ticket that includes one or more combination information pieces, each including a paper size and a paper type, from a server apparatus and generates a print job for the document data, the method comprises the steps of: a size designation unit selecting and designating a paper size to be used to print out the document data received from the server apparatus; a type designation unit selecting and designating a paper type to be used to print out the document data received from the server apparatus; and a control unit performing control such that, in a case where designation of a paper size by the size designation unit is performed preceding designation of a paper type by the type designation unit, a combination information piece that includes the paper size designated by the size designation unit is extracted from among the one or more combination information pieces included in the job ticket, and the paper type included in the extracted combination information piece is set as a paper type that is selectable by the type designation unit, and in a case where designation of a paper type by the type designation unit is performed preceding designation of a paper size by the size designation unit, a combination information piece that includes the paper type designated by the type designation unit is extracted from among the one or more combination information pieces included in the job ticket, and the paper size included in the extracted combination information piece is set as a paper size that is selectable by the size designation unit.

According to yet another aspect of the present invention, a bookbinding system including a server apparatus that outputs document data and a job ticket that includes one or more combination information pieces, each including a paper size and a paper type, and a client apparatus that receives the document data and the job ticket from the server apparatus and generates a print job for the document data, wherein the client apparatus comprises: a size designation unit configured to designate a paper size to be used to print out the document data received from the server apparatus; a type designation unit configured to designate a paper type to be used to print out the document data received from the server apparatus; and a control unit configured to perform control such that, in a case where designation of a paper size by the size designation unit is performed preceding designation of a paper type by the type designation unit, a combination information piece that includes the paper size designated by the size designation unit is extracted from among the one or more combination information pieces included in the job ticket, and the paper type included in the extracted combination information piece is set as a paper type that is selectable by the type designation unit, and in a case where designation of a paper type by the type designation unit is performed preceding designation of a paper size by the size designation unit, a combination information piece that includes the paper type designated by the type designation unit is extracted from among the one or more combination information pieces included in the job ticket, and the paper size included in the extracted combination information piece is set as a paper size that is selectable by the size designation unit.

The present invention provides a technique that enables a reduction in the possibility of wrong print output settings in a client apparatus.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6A is a diagram showing a data flow in the bookbinding system.

FIG. 6B is a diagram showing an example of job ticket data.

FIG. 15 is a detailed flowchart showing of processing for designating paper type.

FIG. 17 is a diagram showing another data flow in the bookbinding system according to Embodiment 2.

FIG. 18 is a diagram illustrating designation using a paper-feed port number.

DESCRIPTION OF THE EMBODIMENTS

Hereinafter, exemplary embodiments of the present invention will be described in detail with reference to the accompanying drawings. Note that the embodiments described below are only illustrative and not intended to limit the scope of the present invention.

Embodiment 1

A client PC that receives application data (document data) and a job ticket that includes one or more combination information pieces, each indicating a combination of paper size and paper type, and generates print job data (print job) is given as an example of Embodiment 1 of a client apparatus according to the present invention. Note that the client PC includes an electronic document writer that converts application data created by a general application into a predetermined electronic document file, and a bookbinding application for performing layout of the electronic document file.

System Configuration

Figure 1:
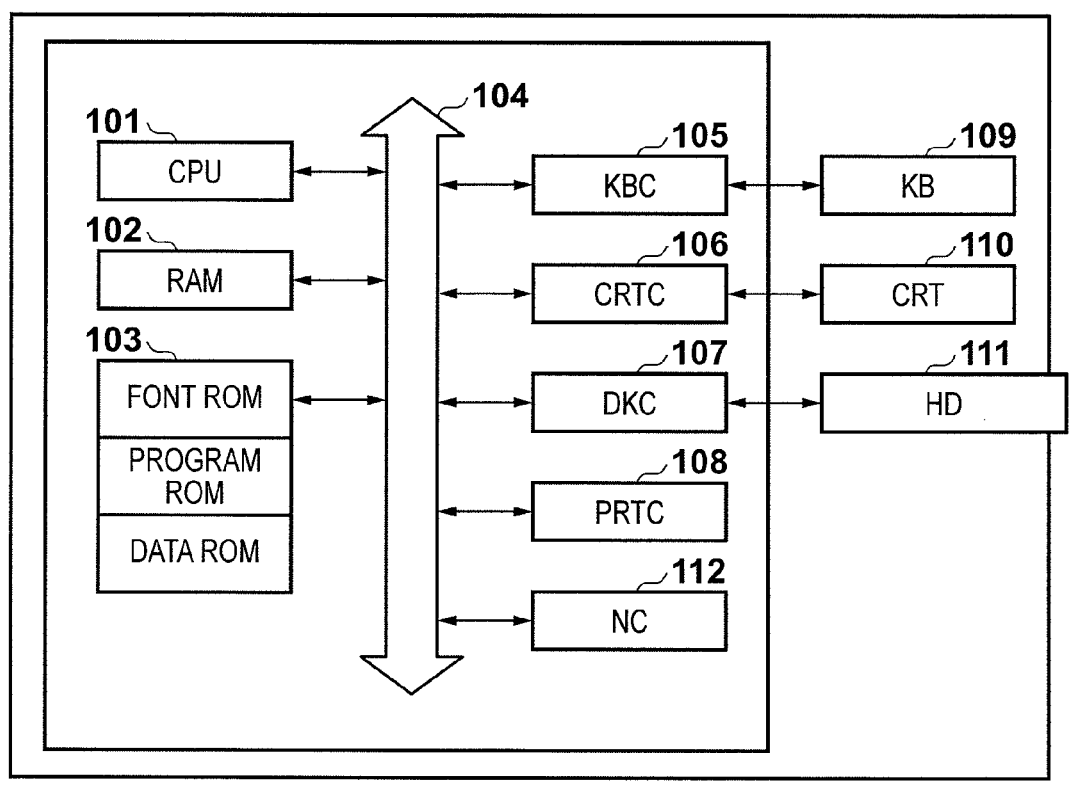
FIG. 1 is a block diagram showing a configuration of a client apparatus according to Embodiment 1.

FIG. 1 is a block diagram showing a configuration of the client apparatus according to Embodiment 1. A CPU 101 executes programs such as an OS, a general application, or a bookbinding application that has been loaded from a ROM 103 or a hard disk (HD) 111 into a RAM 102. The CPU 101 also executes a control program for performing control shown in a flowchart, which will be described later.

The RAM 102 functions as, for example, a main memory and a work area of the CPU 101. A keyboard controller (KBC) 105 controls key input from a keyboard 109 and a pointing device (not shown). A CRT controller (CRTC) 106 controls display performed by a CRT display 110. A disk controller (DKC) 107 controls access to/from, for example, the HD 111 or a floppy (registered trademark) disk (FD) that stores, for example, a boot program, various types of applications, font data, a user file, and an edited file described later. A PRTC 108 controls exchange of signals with a connected printer. An NC 112 is connected to a network and executes processing for controlling communication with other devices connected to the network.

Figure 2:
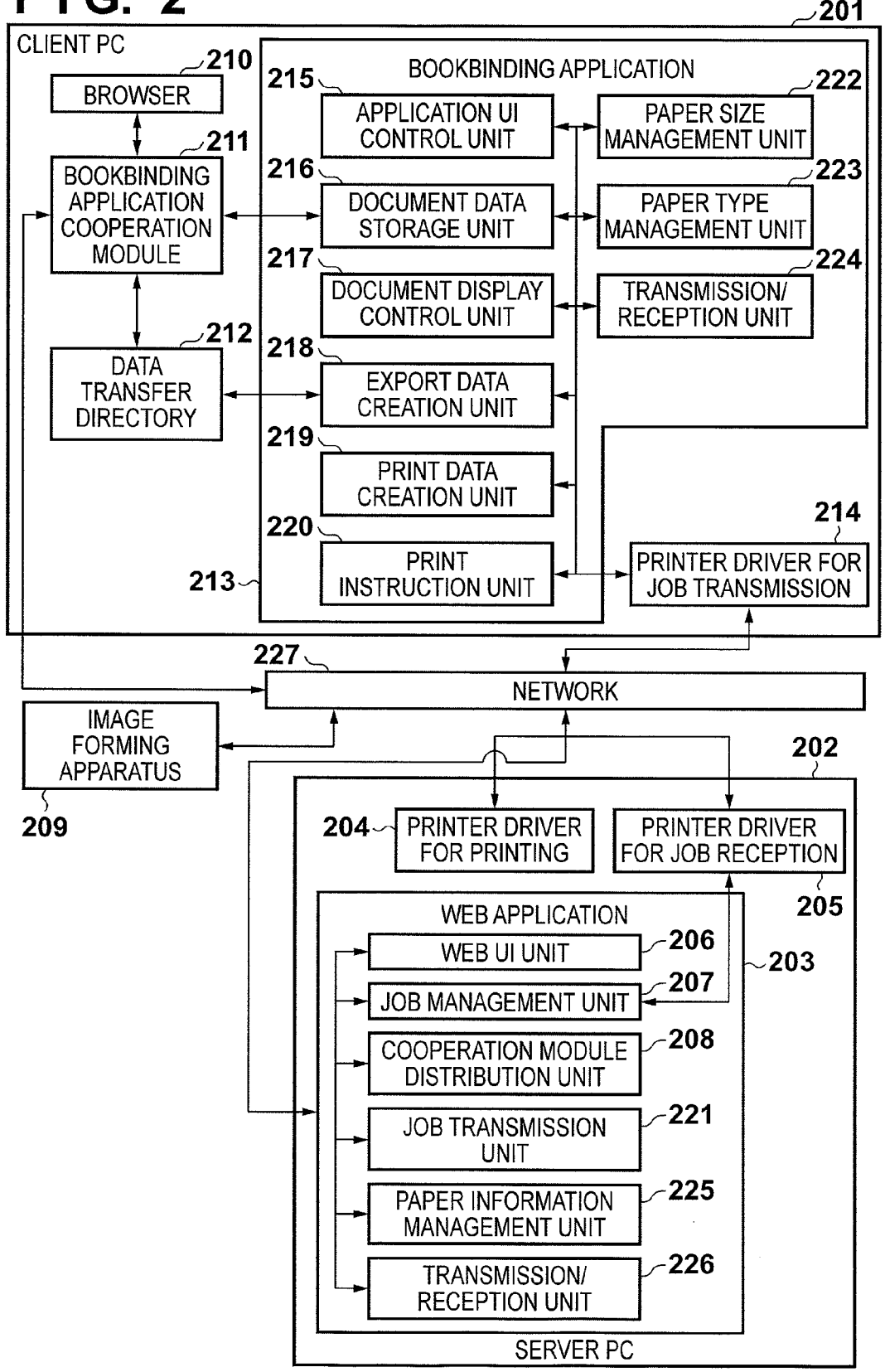
FIG. 2 is a functional configuration diagram of a bookbinding system according to Embodiment 1.

FIG. 2 is a functional configuration diagram of a bookbinding system according to Embodiment 1. A client PC 201 is configured such that communication with a server PC 202 and an image forming apparatus 209 is possible via a network 227. Note that the network 227 may be an arbitrary network such as a LAN or WAN as long as it enables communication.

The server PC 202 has a Web application 203, a printer driver 204 for printing, and a printer driver 205 for job reception. A Web UI unit 206 is a module provided in the Web application 203. The Web UI unit 206 is a function unit that manages/creates a screen to be displayed in the browser by the Web application 203. A job management unit 207 manages jobs handled by the Web application 203. The jobs managed by the job management unit 207 can be displayed or printed in the browser.

The job management unit 207 manages print jobs sent from the printer driver 205 for job reception. A cooperation module distribution unit 208 is a function unit that distributes, to the client PC 201, a program (bookbinding application cooperation module 211) that is necessary for the client PC 201 to operate in cooperation with the server PC 202. A paper information management unit 225 records and edits a list of paper information pieces that can be used by the Web application 203. The data being managed consists of at least paper size and paper type, the details of which will be described later. A transmission/reception unit 226 is a functional unit that controls transmission/reception of data or information between the Web application 203 and a program in an external apparatus. In the following description, the transmission/reception unit 226 is mainly used for transmission/reception of various types of data and event information to/from a bookbinding application 213. The printer driver 204 for printing is a functional unit that sends a print job to the image forming apparatus 209.

The client PC 201 has a browser 210, the bookbinding application cooperation module 211, a data transfer directory 212, the bookbinding application 213, and a printer driver 214 for job transmission. The browser 210 displays a Web page that is managed by the Web UI unit 206 of the server PC described above. As described above, the bookbinding application cooperation module 211 is a program downloaded from the cooperation module distribution unit 208 of the server PC 202 and for operating in cooperation with the server PC 202. The bookbinding application cooperation module 211, for example, enables the bookbinding application 213 to be started up via the network using the browser.

The data transfer directory 212 is a file management area of the client PC 201. The data transfer directory 212 only needs to be a data management area that can be used by applications on the OS. Data is arranged in the data transfer directory 212 and used by the bookbinding application cooperation module 211 or the bookbinding application 213. The printer driver 214 for job transmission is a printer driver. Upon receiving a print instruction from the bookbinding application 213, the printer driver 214 for job transmission generates a print job and transmits that print job to the printer driver 205 for job reception of the server PC 202 via the network 227.

The Web application 203 of the server PC 202 creates application data and job ticket data, which are then transmitted to the bookbinding application 213 of the client PC 201. Here, application data 601 refers to a printable electronic file, such as a text document or a text image, which has been created by a general application. Job ticket data 600 refers to data such as JDF (Job Definition Format) data that describes a procedure performed in accordance with the print instruction. The bookbinding application 213 of the client PC 201 reads the application data and the job ticket data, sets print setting information for print-out, and generates a print job. Various functional units 215 to 220 in the bookbinding application 213 operate in cooperation with one another, and therefore it is possible to freely perform data communications and to freely provide control instructions. A bookbinding application UI control unit 215 controls a UI of the bookbinding application 213. Specifically, the bookbinding application UI control unit 215 can receive instructions such as a print instruction from a user, an instruction to create export data that is not for printing, an instruction as to paper information used for printing, and an instruction indicating the paper-feed port from which a document is to be supplied during printing.

A document data storage unit 216 stores an application file and document data to be displayed by the bookbinding application UI control unit 215. A document display control unit 217 controls the way in which the bookbinding application 213 displays document data on a display. In other words, the document display control unit 217 controls display of a thumbnail to be shown to the user or a thumbnail that reflects a page layout of the print setting information that has been set.

An export data creation unit 218 creates data for export. Specifically, the bookbinding application 213 has, in addition to a printing function, a function of converting data handled in the bookbinding application 213 into an image file and exporting that image file. In other words, when the bookbinding application 213 uses the export function, the export data creation unit 218 creates data for export. The print data creation unit 219 converts data handled in the bookbinding application 213 into a format suitable for printing and creates print data (print job). A print instruction unit 220, transfers print data to the printer driver 214 for job transmission upon receiving a print instruction.

A paper size management unit 222 records a list of paper sizes that can be used in the bookbinding application 213 and also records the current setting value. Similarly, a paper type management unit 223 records a list of paper types that can be used in the bookbinding application 213 and also records the current setting value. A transmission/reception unit 224 is a functional unit for the bookbinding application 213 to perform data transmission/reception via the network 227. Here, the transmission/reception unit 224 is mainly used for data transmission/reception to/from the Web application 203.

Figure 3:
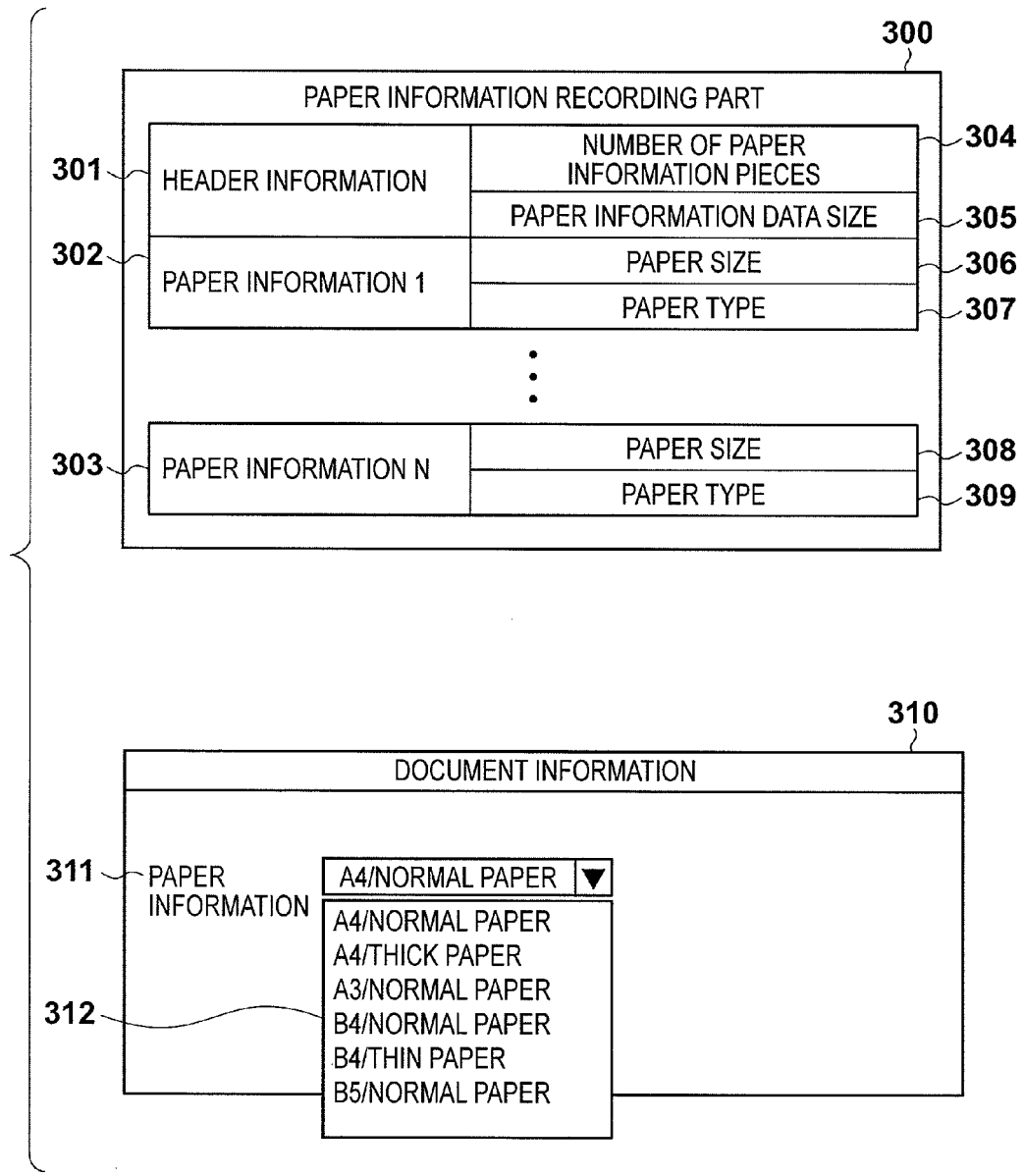
FIG. 3 is a diagram illustrating paper information management by a Web application.

FIG. 3 is a diagram illustrating paper information management by the Web application 203. Reference numeral 300 denotes a data format of a paper information recording part. Reference numeral 301 denotes a header information part that includes the number of recorded paper information pieces 304 and a data size 305 of the paper information recording part. Reference numeral 302 denotes a paper information piece, in this case, the first paper information record. Each paper information record includes paper size information 306 such as A4 or B5 and paper type information 307 such as normal paper or thick paper. Similarly, reference numeral 303 denotes the Nth paper information record that records paper size 308 and paper type 309.

Reference numeral 310 denotes a paper information setting screen that is displayed by the Web UI unit 206 of the Web application 203. This screen is used when transmitting a book-bookbinding instruction or a print instruction from the Web application 203 to the bookbinding application 213. Reference numeral 311 denotes a field for paper information that has been set, and currently indicates that "A4/normal paper" has been set. Reference numeral 312 denotes a drop-down list that displays a list of selectable paper information pieces. The drop-down list is displayed by, for example, moving a cursor that operates in conjunction with a pointing device, such as a mouse, over the paper information field 311 and clicking a mouse button.

Figure 4:
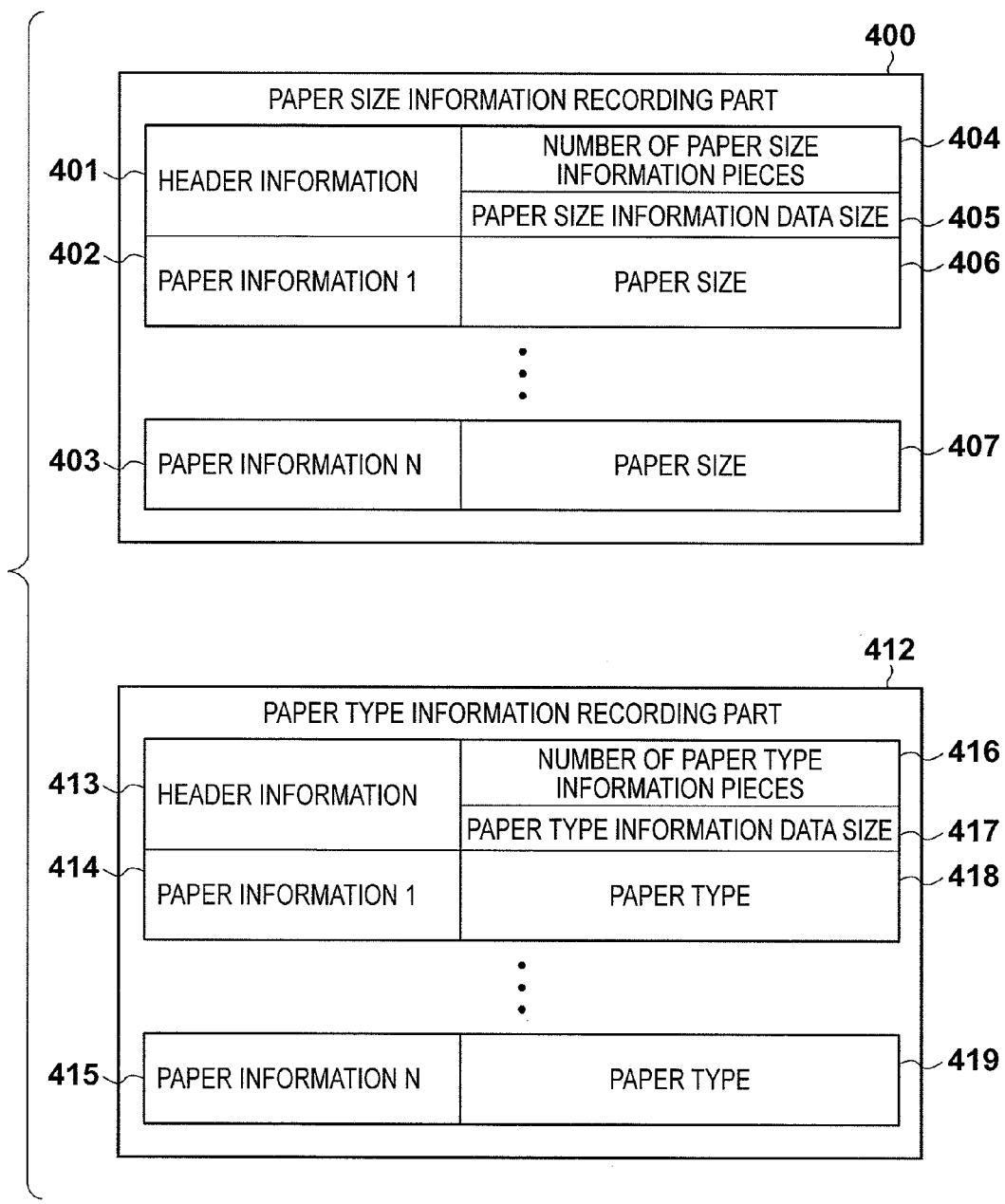
FIG. 4 is a diagram illustrating paper information management by a bookbinding application.

FIG. 4 is a diagram illustrating paper information management by the bookbinding application 213.

Reference numeral 400 denotes a data format of a paper size information recording part. Reference numeral 401 denotes a header information part that includes the number of recorded paper size information pieces 404 and a data size 405 of the paper size information recording part. Reference numeral 402 denotes a paper size information piece, in this case, the first paper size information record. Each paper size information record records paper size information 406 such as "A4" or "B5". Similarly, reference numeral 403 denotes the Nth paper size information record that records paper size 407.

Reference numeral 412 denotes a data format of a paper type information recording part. Reference numeral 413 denotes a header information part that includes the number of recorded paper type information pieces 416 and a data size 417 of the paper type information recording part. Reference numeral 414 denotes a paper type information record, in this case, the first paper type information record. Each paper type information record records paper type information 418 such as "normal paper" or "thin paper". Similarly, reference numeral 415 denotes the Nth paper type information record that records paper type information 419.

Figure 5:
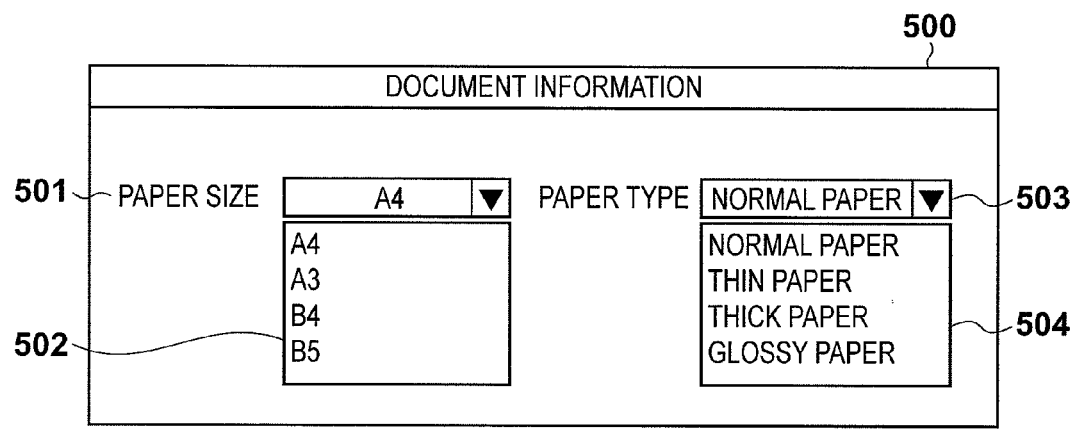
FIG. 5 is a diagram showing a user interface (UI) for setting paper information in the bookbinding application.

FIG. 5 is a diagram showing a user interface (UI) for setting paper information in the bookbinding application 213. The UI is used in the case of carrying out detailed bookbinding settings or print settings in accordance with general instructions from the Web application 203, such as "saddle stitch binding".

Reference numeral 500 denotes the UI for setting document information, and in this case, an example is shown in which document information is set by selecting and designating "paper size" and "paper type". Reference numeral 501 denotes a field indicating the currently set paper size (size designation unit), in this case, indicating "A4". Reference numeral 502 denotes a list of paper sizes that can be set as a paper size, the list displaying all paper sizes that can be used by the image forming apparatus 209. Reference numeral 503 denotes a field indicating the currently set paper type (type designation unit), in this case, indicating "normal paper". Reference numeral 504 denotes a list of paper types that can be set as a paper type, the list displaying, like the list of paper sizes, all paper types that can be used by the image forming apparatus 209.

FIG. 6A is a diagram showing a data flow in the bookbinding system. First, the Web application 203 of the server PC 202 prepares the job ticket data 600 and the application data 601, which is a content received from a user and used for printing. Examples of the application data include files in the PDF format provided by Adobe Systems.

The job ticket data 600 and the application data 601 are then transmitted from the server PC 202 to the client PC 201 and passed to the bookbinding application 213. The bookbinding application 213 has a preview screen for displaying setting results, and therefore it is possible to perform detailed settings. When an instruction to execute printing is given, the bookbinding application 213 creates print job data 602 using the printer driver 214 for job transmission. The print job data 602 is initially transmitted to the Web application 203 of the server PC 202, undergoes processing such as recording a job history, and is then transmitted to the image forming apparatus 209.

FIG. 6B is a diagram showing a data format of the job ticket data. Reference numeral 604 denotes a header information part that records the number of paper information pieces 607 recorded in the job ticket data, the data size of the entire paper information, and the default-designated paper information number. Reference numeral 605 denotes the first paper information piece that includes a paper size 610 and a paper type 611. Reference numeral 606 denotes the Nth paper information piece that similarly includes a paper size 612 and a paper type 613. Reference numeral 614 denotes a bookbinding setting information part that records a bookbinding setting such as designation of "2-in-1" layout and finishing setting information such as center/three-position stapling. In accordance with this instruction, the bookbinding application 213 provides a preview display, and therefore it is possible for a user to, for example, align image positions to a greater extent and to check and change finishing results.

Various Types of Information Tables

Figure 11:
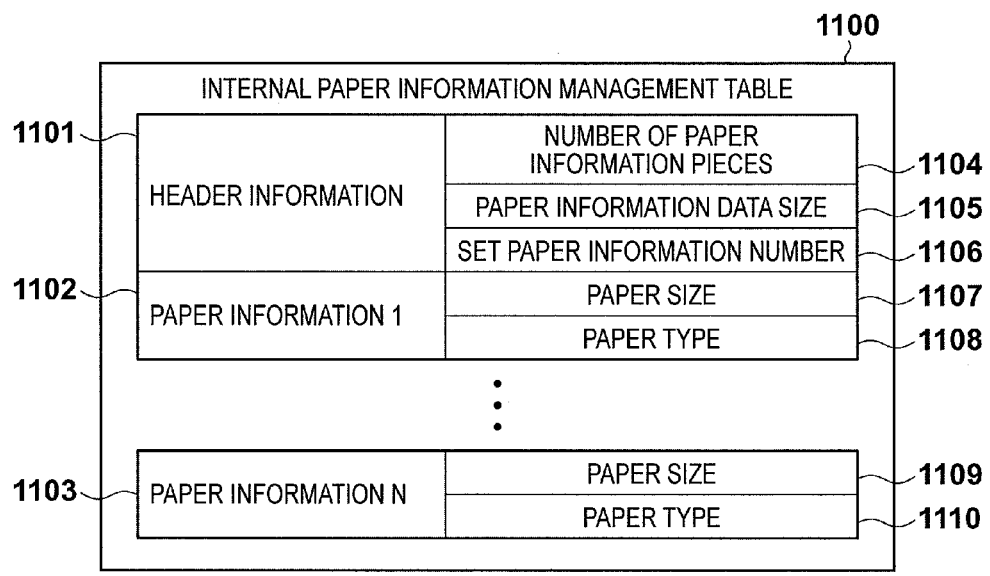
FIG. 11 is a diagram illustrating an internal paper information management table.

FIG. 11 is a diagram illustrating an internal paper information management table used in the bookbinding application 213. Header information 1101 includes the number of paper information pieces 1104, a paper information data size 1105, and a set paper information number 1106. The first paper information piece 1102 includes a paper size 1107 and a paper type 1108 that can be designated, and the Nth paper information piece 1103 includes a paper size 1109 and a paper type 1110 that can be designated. Note that the internal paper information management table is managed independently of the paper information used in the server PC 202 to generate a job ticket.

Figure 12:
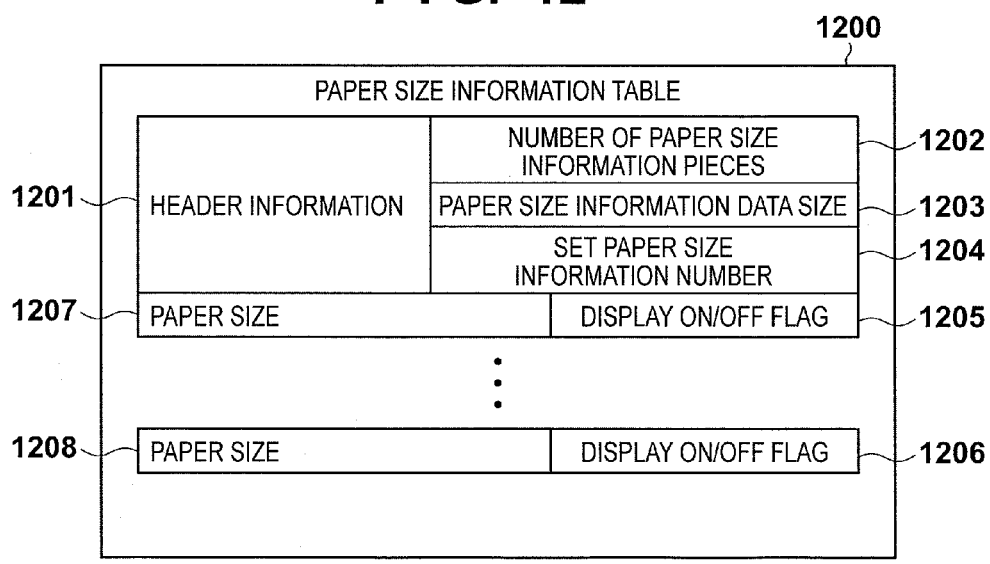
FIG. 12 is a diagram illustrating a paper size information table.

FIG. 12 is a diagram illustrating a paper size information table used in the bookbinding application 213. Header information 1201 includes the number of paper size information pieces 1202, a paper size information data size 1203, and a set paper size information number 1204. The set paper size information number is the number of the currently selected paper size record. A paper size 1207 records not only the paper size information but also an ON/OFF flag that indicates whether or not to display the record as a selection candidate. Note that the determination of whether or not to display the record depends on the currently set paper type information.

Figure 13:
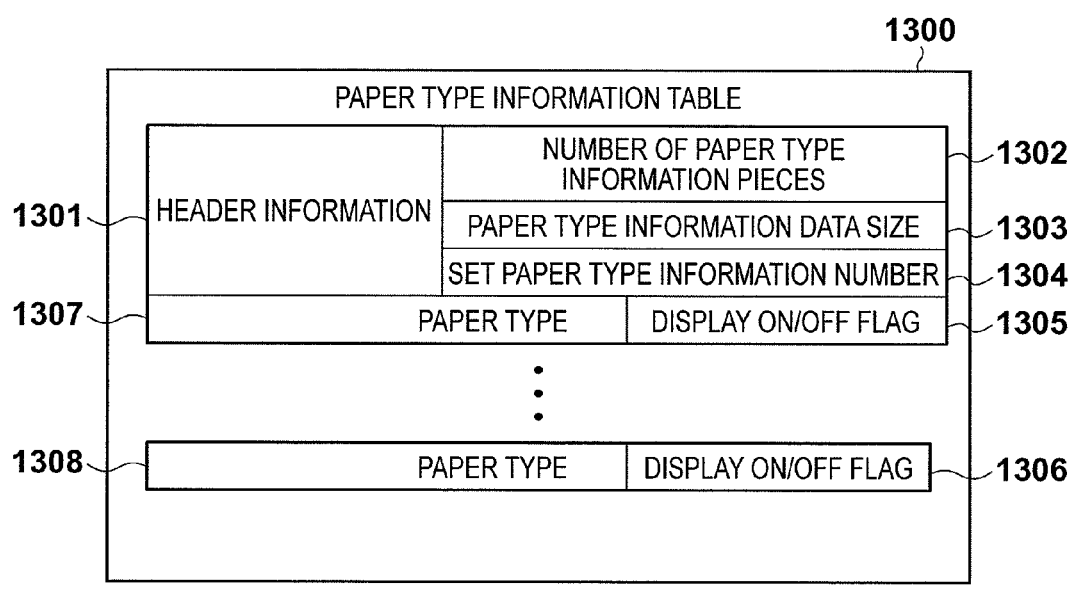
FIG. 13 is a diagram illustrating a paper type information table.

FIG. 13 is a diagram illustrating a paper type information table used in the bookbinding application 213. Header information 1301 includes the number of paper type information pieces 1302, a paper type information data size 1303, and a set paper type information number 1304. The set paper type information number is the number of the currently selected paper type record. A paper type 1307 records not only the paper type information but also an ON/OFF flag that indicates whether or not to display the record as a selection candidate. Note that the determination of whether or not to display the record depends on the currently set paper size information.

Operations Performed by System

Figure 10:
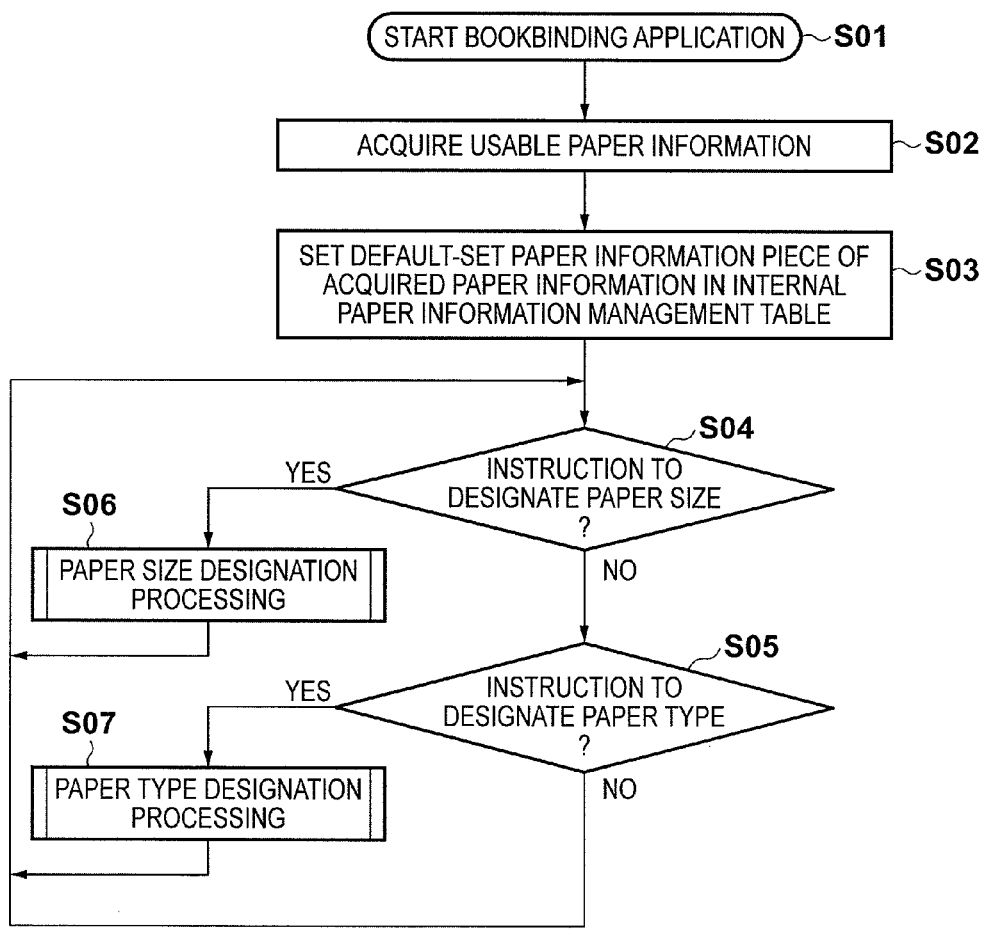
FIG. 10 is a flowchart of operations for describing Embodiment 1.

FIG. 10 is a flowchart of operations for describing Embodiment 1.

In step S01, the client PC 201 receives job ticket data and an application file from the Web application 203, and the bookbinding application 213 is started. In step S02, the bookbinding application 213 extracts paper information from the job ticket data.

Figure 9:
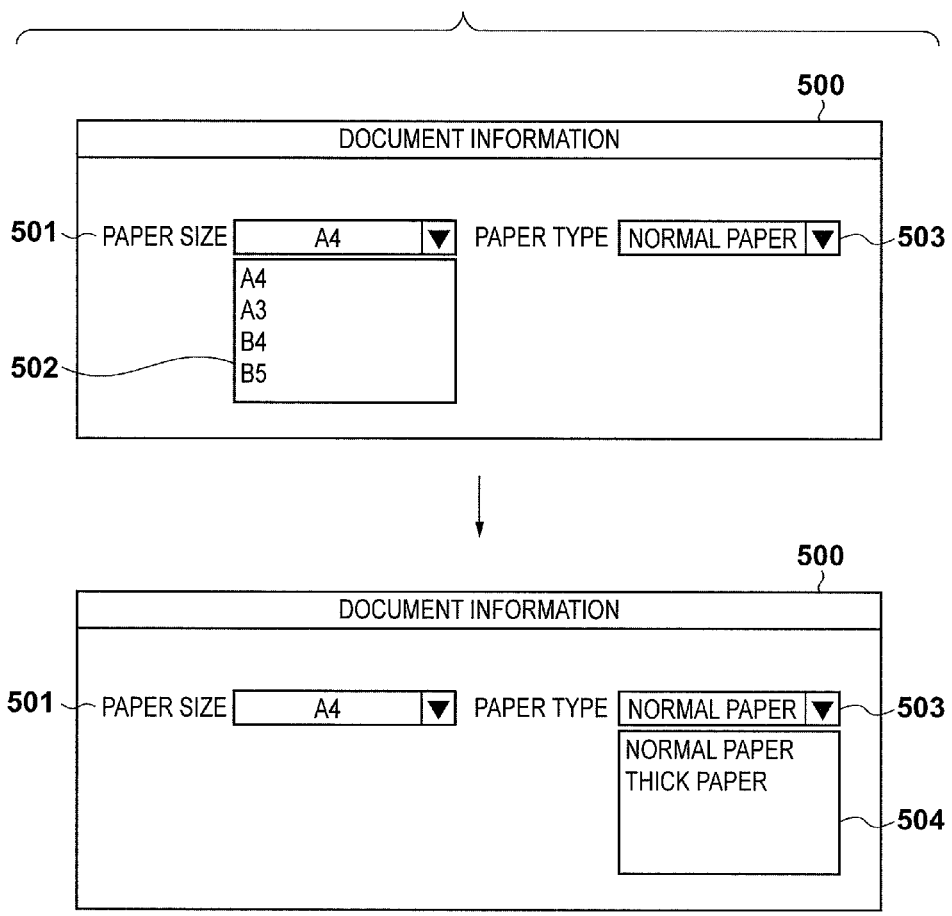
FIG. 9 is a diagram illustrating an operation on the UI (pattern 3).

In step S03, the bookbinding application 213 creates the internal paper information management table described with reference to FIG. 11, using the paper information extracted in step S02 and default settings. Then, in step S04, the bookbinding application 213 determines whether or not paper size designation has been selected through an UI. FIG. 9 shows an example of the UI displayed on the screen at this time. If paper size designation has been selected, the procedure proceeds to step S06, and after the processing for designating a paper size is completed, the procedure returns to step S04.

On the other hand, if paper size designation has not been selected in step S04, the procedure proceeds to step S05, in which it is determined whether or not paper type designation has been selected. If paper type designation has been selected, the procedure proceeds to step S07, and after a paper type has been designated, the procedure returns to step S04. Note that if paper type designation has not been selected in step S05, the procedure also returns to step S04.

Figure 14:
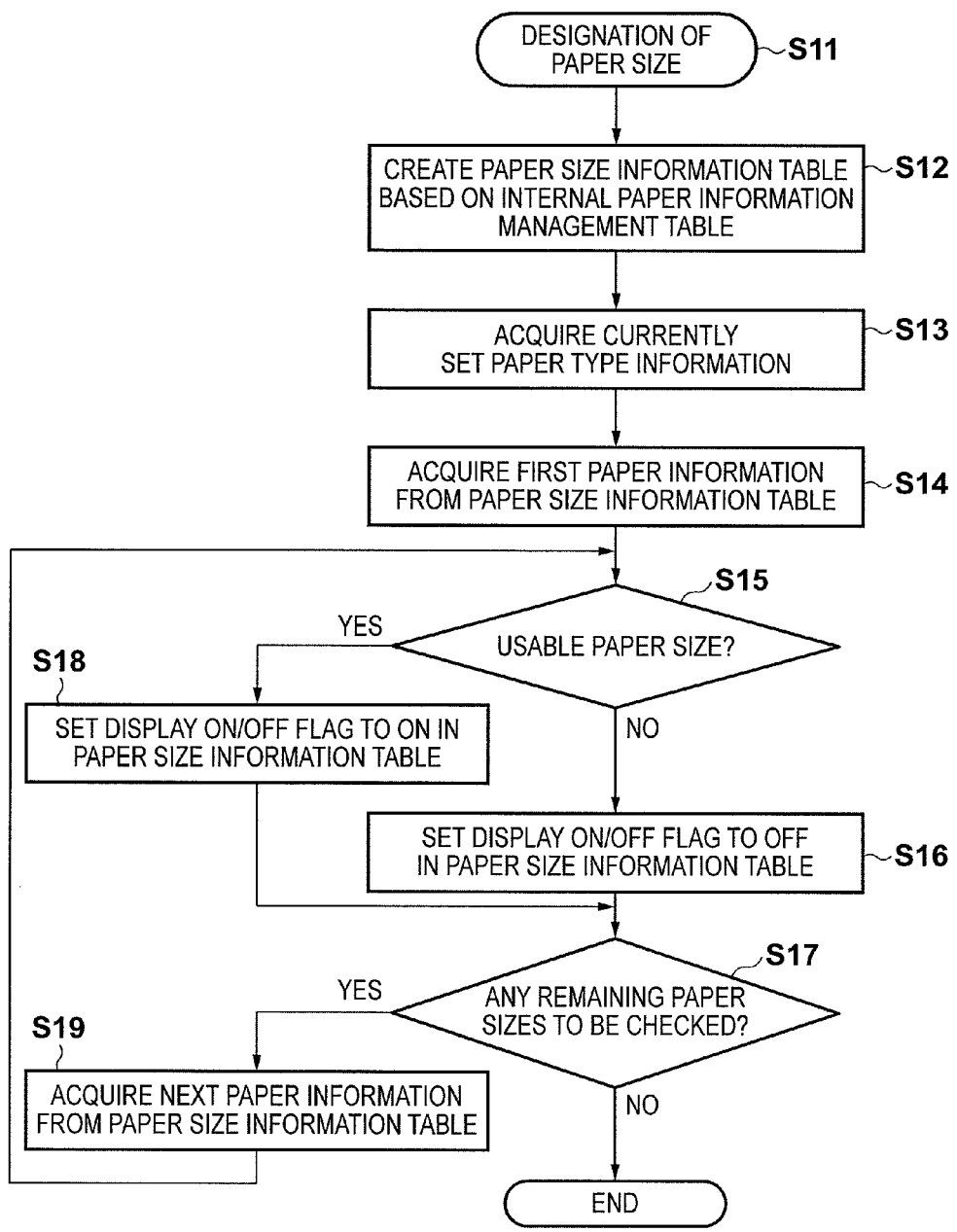
FIG. 14 is a detailed flowchart showing of processing for designating paper size.

FIG. 14 is a detailed flowchart of the processing for designating a paper size (step S06).

The processing starts in step S11, and in step S12, the paper size information table shown in FIG. 12 is generated by extracting only paper size information from the internal paper information management table shown in FIG. 11.

In step S13, information on the paper type that is currently set in the bookbinding application 213 is acquired from the set paper information number 1106. In step S14, the first paper size 1207 is acquired from the paper size information table 1200. In step S15, it is determined whether or not the paper size information acquired in step S14 is selectable. Specifically, paper sizes that can be used with the currently set paper type acquired in step S13 are determined from combinations of paper information pieces in the internal paper information management table 1100.

For example, in the case where the internal paper information management table has recorded therein only two paper information pieces, namely, "A4/normal paper" and "B5/thick paper", and the paper type information acquired in step S13 indicates "normal paper", only "A4" is selectable as a paper size. If it has been determined in step S15 that the paper size is usable, the procedure proceeds to step S18, in which the display ON/OFF flag is set to ON in the paper size information table. For example, a display ON/OFF flag 1205 is set to ON, and thereafter the procedure proceeds to step S17. If it has been determined in step S15 that the paper size is not usable, the procedure proceeds to step S16, in which the display ON/OFF flag is set to OFF in the paper size information table, and thereafter the procedure proceeds to step S17. In step S17, it is determined whether or not there are any remaining paper size records to be checked in the paper size information table. If there is no remaining paper size record, the processing ends. If there are any remaining paper size records, the procedure proceeds to step S19. In step S19, the next paper size information piece is extracted from the paper size information table. The display ON/OFF flags of all paper size information records are set by repeating steps S15 to S17.

FIG. 15 is a detailed flowchart of the processing for designating a paper type (step S07). This is equivalent to processing in which "paper size" in the detailed flowchart in FIG. 14 is replaced by "paper type".

The processing starts in step S21, and in step S22, the paper type information table shown in FIG. 13 is created by extracting only paper type information from the internal paper information management table shown in FIG. 11.

In step S23, information on the paper size that is currently set in the bookbinding application 213 is acquired from the set paper information number 1106. In step S24, the first paper size 1307 is acquired from the paper type information table 1300. In step S25, it is determined whether or not the paper type information acquired in step S24 is selectable. Specifically, paper types that can be used with the currently set paper size acquired in step S23 are determined from combinations of paper information pieces in the internal paper information management table 1100.

For example, in the case where the internal paper information management table has recorded therein only two paper information pieces, namely, "A4/normal paper" and "B5/thick paper", and the paper size information acquired in step S23 indicates "A4", only "normal paper" is selectable as a paper type. If it has been determined in step S25 that the paper type is usable, the procedure proceeds to step S28, in which the display ON/OFF flag is set to ON in the paper type information table. For example, a display ON/OFF flag 1305 is set to ON, and thereafter the procedure proceeds to step S27. If it has been determined in step S25 that the paper type is not usable, the procedure proceeds to step S26, in which the display ON/OFF flag in the paper size information table is set to OFF, and thereafter the procedure proceeds to step S27. In step S27, it is determined whether or not there are any remaining paper type records to be checked in the paper type information table. If there is no remaining paper type record, the processing ends. If there are any remaining paper type records, the procedure proceeds to step S29. In step S29, the next paper type information piece is extracted from the paper type information table. The display ON/OFF flags of all paper type information records are set by repeating steps S25 to S27.

Note that although a check is performed when the setting UI is displayed in the above description, a configuration is also possible in which a check is not performed when the UI is displayed. In this case, a similar check is performed in, for example, executing printing. For a combination that cannot be used, a warning message is displayed on the screen, and the execution of printing is cancelled. For example, a warning message such as "Selected combination of paper size and paper type cannot be used" may be displayed.

Exemplary Operations on UI for Setting Paper Information

Figure 7:
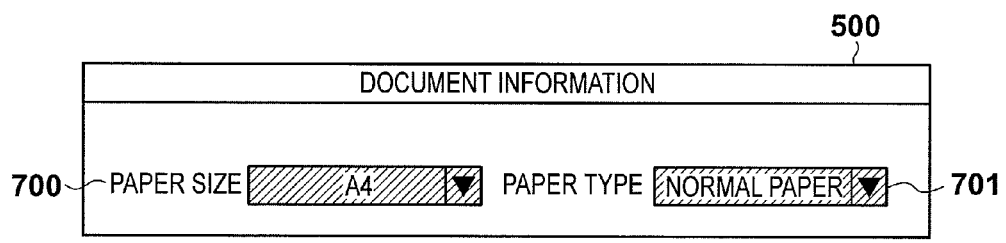
FIG. 7 is a diagram illustrating an operation on the UI (pattern 1).
Figure 8:
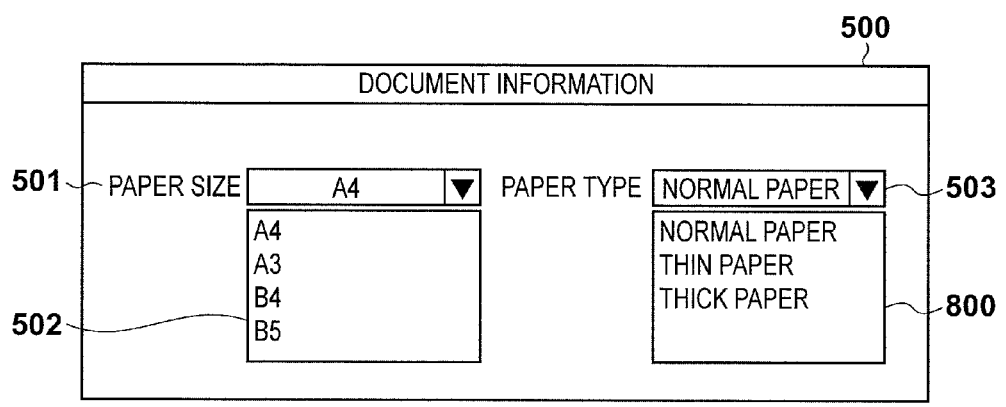
FIG. 8 is a diagram illustrating an operation on the UI (pattern 2).

FIGS. 7 to 9 are diagrams illustrating exemplary operations performed on a document information UI displayed in the bookbinding application 213 when a job ticket with paper information recorded is received from the Web application 203.

FIG. 7 is a diagram showing a first operation pattern on the UI. In particular, FIG. 7 illustratively shows an operation performed in the case where the job ticket data includes only a paper information piece that designates "A4/normal paper" (default setting). Reference numeral 700 denotes a field indicating that the currently set paper size information is "A4", and the grayed out background of the field indicates that this item cannot be changed. Similarly, reference numeral 701 denotes a field indicating that the currently set paper type information is "normal paper", and similarly the item in this field also cannot be changed. That is, the paper information pieces in the job ticket are forcibly designated.

FIG. 8 is a diagram showing a second operation pattern on the UI. In particular, FIG. 8 shows an example of the case where the job ticket data includes six paper information pieces, namely, "normal paper/A4", "normal paper/A3", "normal paper/B4", "normal paper/B5", "thick paper/A4", and "thin paper/B4". In this case, like in the case of FIG. 5, "A4", "A3", "B4", and "B5" are displayed as selection candidates 502 for paper size. On the other hand, as selection candidates 800 for paper type, "normal paper", "thin paper", and "thick paper" are displayed, but "glossy paper" is not displayed. This is because, since the job ticket data does not include any records that include "glossy paper", it is determined that "glossy paper" cannot be used.

FIG. 9 is a diagram showing a third operation pattern on the UI. In particular, FIG. 9 shows an operation performed on the UI in the case where the job ticket data includes six paper information pieces, namely, "normal paper/A4", "normal paper/A3", "normal paper/B4", "normal paper/B5", "thick paper/A4", and "thin paper/B4". However, unlike in the case of FIG. 8, display is controlled based on combinations of paper type and paper size.

The upper diagram of FIG. 9 shows an operation performed in the case where a user designates first paper type and then paper size. In particular, the diagram illustratively shows the selection candidates 502 for paper size in the case where "normal paper" has been designated as paper type. Specifically, it is determined from the job ticket data that "A4", "A3", "B4", and "B5" are obtained from the combinations that include "normal paper" and displayed as selection candidates. Alternatively, paper sizes that are common to both paper information pieces of the job ticket that include the designated paper type and paper information pieces of the internal paper information management table that include the designated paper type may be set as selectable paper sizes.

On the other hand, the lower diagram of FIG. 9 shows an operation performed in the case where a user designates first paper size and then paper type. In particular, the diagram illustratively shows the selection candidates 504 for paper type in the case where "A4" has been designated as paper size. Specifically, it is determined from the job ticket data that "normal paper" and "thick paper" are obtained from the combinations that include "A4", and displayed as selection candidates. Alternatively, paper types that are common to both paper information pieces of the job ticket that include the designated paper size and paper information pieces of the internal paper information management table that include the designated paper size may be set as selectable paper types.

As described above, in Embodiment 1, the client PC limits the selection of paper size and paper type, based on combination information pieces, each indicating a combination of paper size and paper type, included in a job ticket transmitted from the server PC. Specifically, a conflict check is performed based on the job ticket. This reduces the possibility that a user may carry out wrong print output settings.

Embodiment 2

Embodiment 2 describes processing in which a new paper information piece that has been set in the bookbinding application of a client PC is registered in the Web application of a server PC.

Figure 16A:
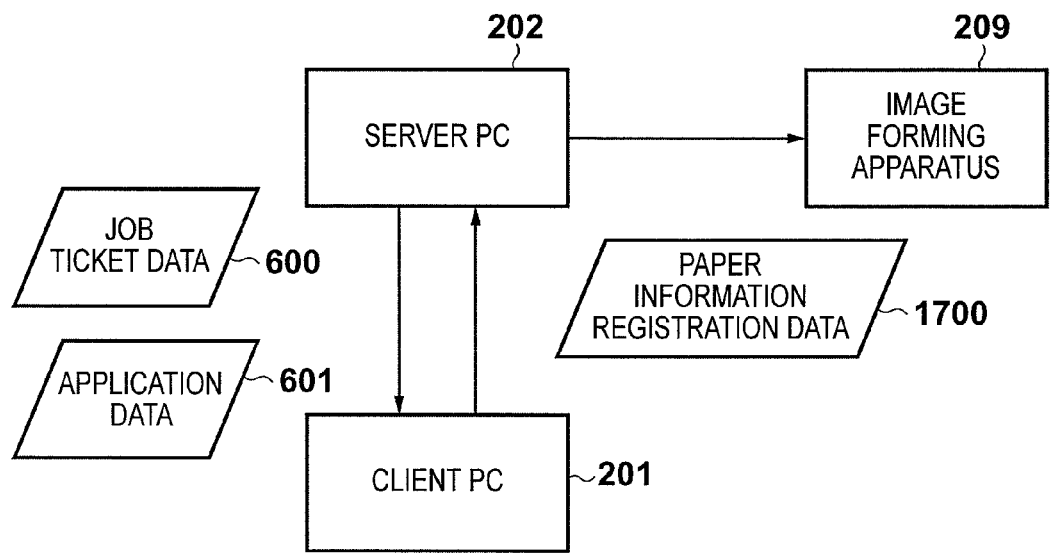
FIG. 16A is a diagram showing a data flow in a bookbinding system according to Embodiment 2.

FIG. 16A is a diagram showing a data flow in a bookbinding system according to Embodiment 2.

The job ticket data 600 and the application data 601 are sent from the Web application 203 of the server PC 202 to the bookbinding application 213 of the client PC 201. Then, the bookbinding application 213 performs processing for setting paper to be used in bookbinding, and it is assumed herein that a combination obtained as a result is one that cannot be used in the Web application 203. In this case, instead of immediately displaying a warning message, the bookbinding application 213 requests the Web application 203 to register the combination that has been received as a result of the paper setting processing.

Figure 16B:
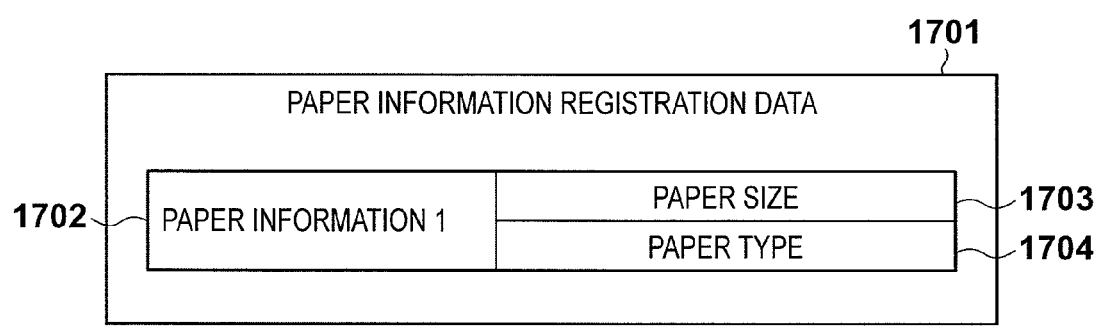
FIG. 16B is a diagram showing an example of paper information registration data.

Reference numeral 1700 denotes this request message. For that request, the SNMP protocol or other arbitrary protocols can be used. FIG. 16B shows the data structure of paper information registration data serving as a request message. Reference numeral 1702 denotes a new paper information record to be added to a registry, reference numeral 1703 denotes paper size information, and reference numeral 1704 denotes paper type information. If the requested paper information has been registered successfully, the Web application 203 can continue the bookbinding processing.

FIG. 17 is a diagram illustrating another data flow in the bookbinding system according to Embodiment 2. Specifically, a description is given of processing performed in the case where the Web application 203 has received a request to register a paper information piece that cannot be registered. In reality, even in the case where the bookbinding application 213 requests registration of a paper information piece, if, for example, the image forming apparatus 209 cannot handle that paper information piece, the paper information piece cannot actually be used.

Thus, the Web application 203 determines whether or not registration is possible, based on, for example, whether or not the paper information piece can be used in the image forming apparatus 209 connected to the system or whether or not paper indicated by the paper information piece is available. If the paper information piece is one that cannot be newly registered, a message 1800 indicating that registration of that paper information piece is not possible is returned to the bookbinding application 213. In response, the bookbinding application 213 displays a warning message such as "This paper setting is not available. Select other settings", and notifies the user the fact that the set paper information piece cannot be used. Note that the SNMP or http protocol or other arbitrary protocols can be used for transmission of the message 1800.

Incidentally, in the above description, paper to be used in the image forming apparatus 209 is designated in accordance with paper information pieces, each consisting primarily of paper size and paper type. However, a paper-feed port number belonging to the image forming apparatus 209 may be designated instead, as a paper selection instruction given to the image forming apparatus 209.

FIG. 18 shows an example in which a paper-feed port number is designated. Reference numeral 1900 denotes an UI for designating a paper-feed port, and reference numeral 1901 denotes the currently selected paper-feed port number. Reference numeral 1902 denotes a drop-down list from which a number assigned to each paper-feed port is selected.

As described above, in Embodiment 2, upon receiving designation of a combination of paper size and paper type that is not included in a job ticket, the client PC requests the server PC to register that combination. This eases the limitations on print output settings by a user.

Embodiment 3

Embodiment 3 describes, in particular, a case where the bookbinding system has a paper cutting function. In Embodiments 1 and 2 described above, paper information is used for printing and also indicates output results. However, in the case where the system has a cutting function, the bookbinding application sets a paper size greater than the size indicated by the paper information designated by the Web application. The desired output result can then be obtained by cutting paper that has been output from the image forming apparatus 209. The cutting function may belong to the image forming apparatus 209 or may belong to another system connected to the network 227.

Figure 19:
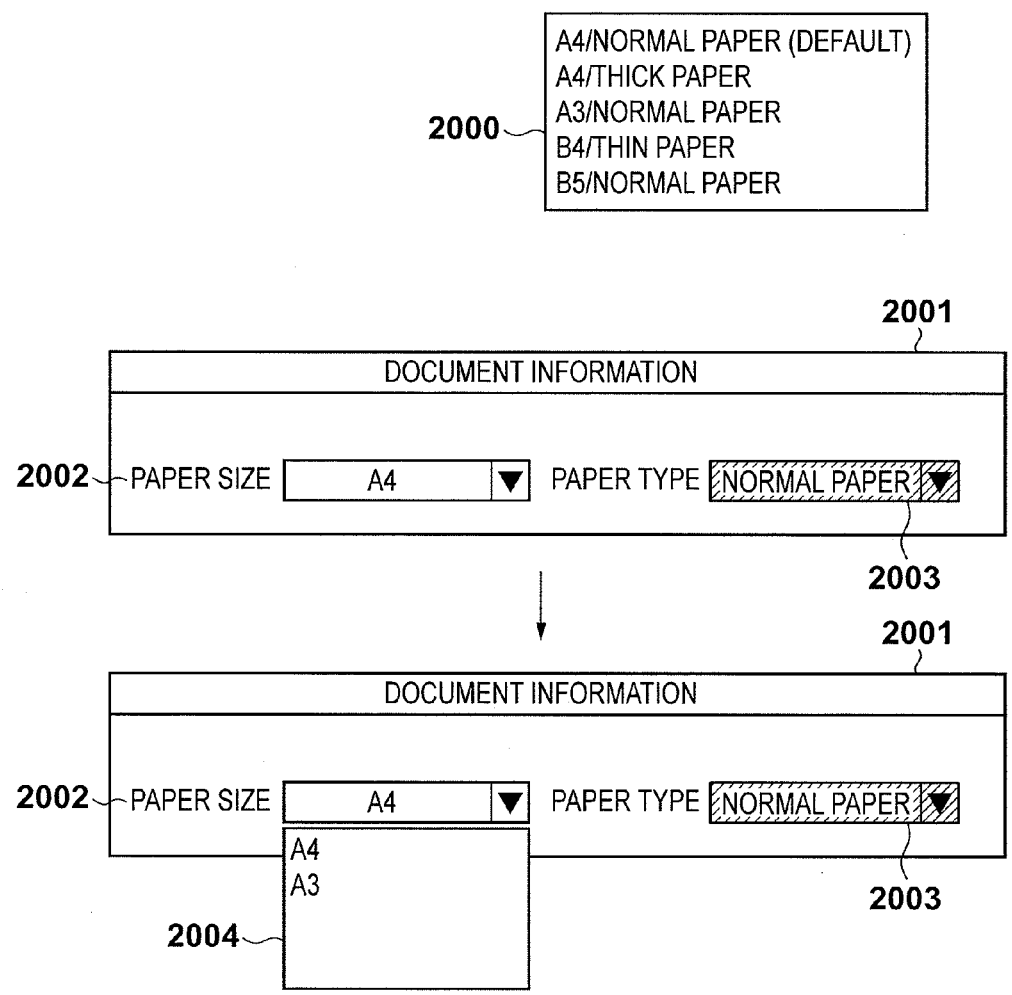
FIG. 19 is a diagram illustrating an operation on a UI according to Embodiment 3.

FIG. 19 is a diagram illustrating an operation on the UI according to Embodiment 3.

Data flows of various types of data are similar to those in the case of FIG. 6A, but the contents of the data differ. Specifically, reference numeral 2000 denotes paper information pieces recorded in the job ticket data 600. In the present example, the paper information piece instructed by the Web application 203 is "A4/normal paper", and this is designated as a default setting. Extracting only the paper information pieces that include "normal paper" obtains four paper information pieces, namely, "A4/normal paper", "A3/normal paper", "B4/normal paper", and "B5/normal paper". In the case where the system does not have a cutting function, it is necessary in all cases to select A4 paper in order to obtain A4-sized outputs. However, if, for example, the image forming apparatus 209 has a cutting function, it is possible to use A3 paper larger than A4 paper for printing and cut the paper to A4 size.

Reference numeral 2001 denotes a UI screen for setting paper information. As in the case of Embodiment 1, the background of the paper type field indicated by 2003 is grayed out, which indicates that the item cannot be changed. However, unlike in the case of Embodiment 1, it is possible to select not only A3 but also A4 as paper size in the paper size field 2002. Note that although only A3, whose short side is equal in length to the long side of A4, is additionally displayed in the present example, it is also possible to additionally display B4. Note that in the case where the paper size to be output is A4, imposing two pages on a single piece of A3 paper enables these pages to be output on A3 paper through a single print operation, thus achieving the effect of improving print efficiency.

Figure 20:
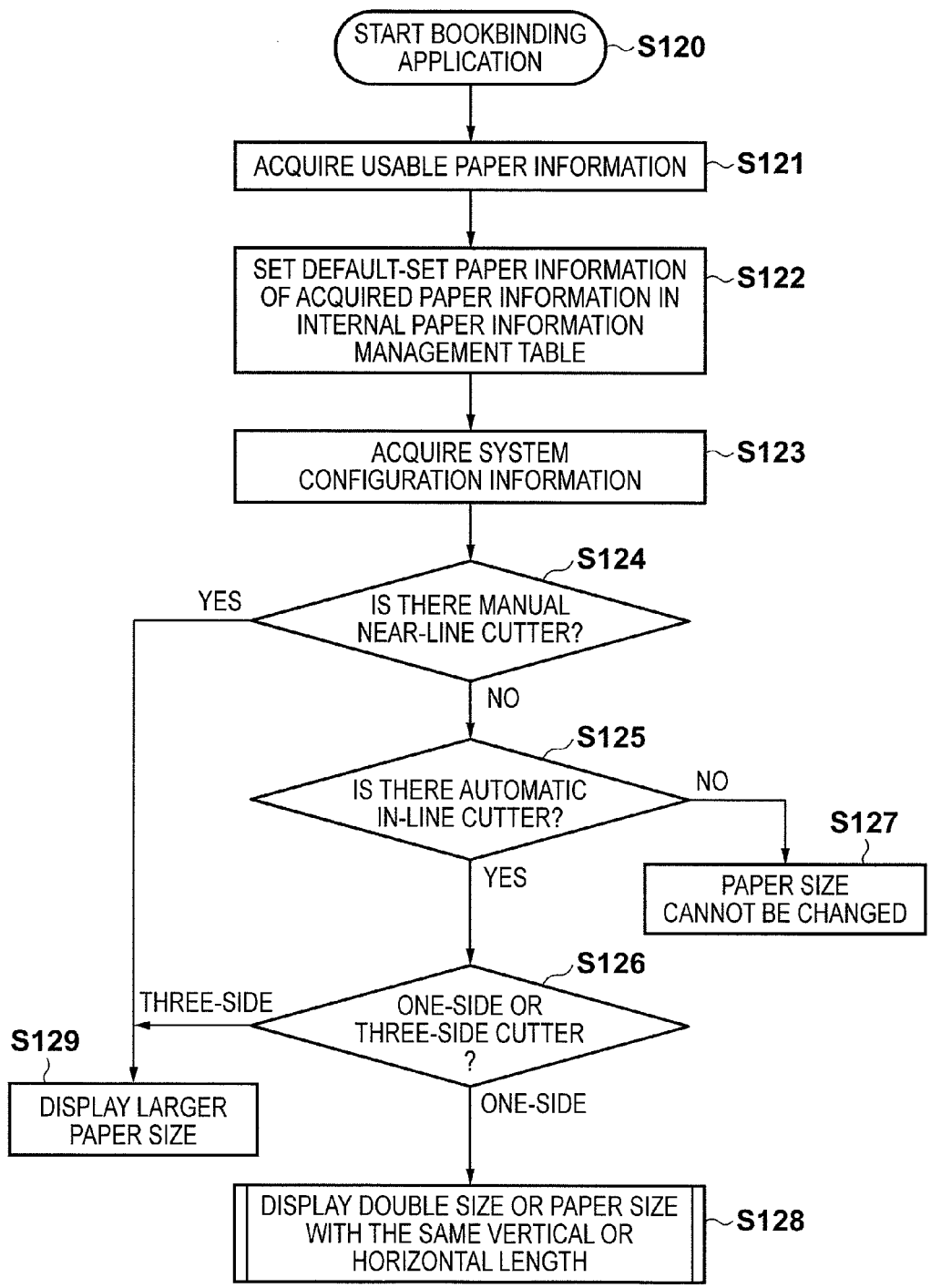
FIG. 20 is a flowchart of operations for describing Embodiment 3.

FIG. 20 is a flowchart of operations for describing Embodiment 3.

Steps S120 to S122 are identical to steps S01 to S03 in the flowchart in FIG. 10. In step S123, the client PC 201 acquires system configuration information from the Web application 203. The system configuration information (device information including availability of a paper cutting function) includes, for example, information as follows:

information indicating whether or not the image forming apparatus 209 is connected to a finishing device having a cutting function; and information indicating whether or not a near-line finishing device having a cutting function is connected to the network 227.

The procedure then proceeds to step S124, in which it is determined whether or not a near-line finishing device having a cutting function is connected to the network 227. If a near-line finishing device is connected, the procedure proceeds to step S129, in which the paper size designated by the job ticket and paper sizes that are larger than the designated paper size are made selectable.

On the other hand, if it has been determined in step S124 that a near-line finishing device is not connected, the procedure proceeds to step S125, in which it is determined whether or not a finishing device having a cutting function is connected to the image forming apparatus 209. If it has been determined that a finishing device is not connected, the procedure proceeds to step S127. In step S127, the same procedure as in Embodiment 1 is performed, in which the paper size designated by the job ticket is not changed.

On the other hand, if it has been determined in step S125 that a cutting finishing device is connected, the procedure proceeds to step S126, in which it is determined whether the finishing device is a one-side cutter or a three-side cutter. In the case of a three-side cutter, the procedure proceeds to step S129, whereas in the case of a one-side cutter, the procedure proceeds to step S128. Paper sizes displayed in step S128 are only those with which the paper size designated by the Web application 203 can be generated in a single execution of document paper cutting.

Figure 21:
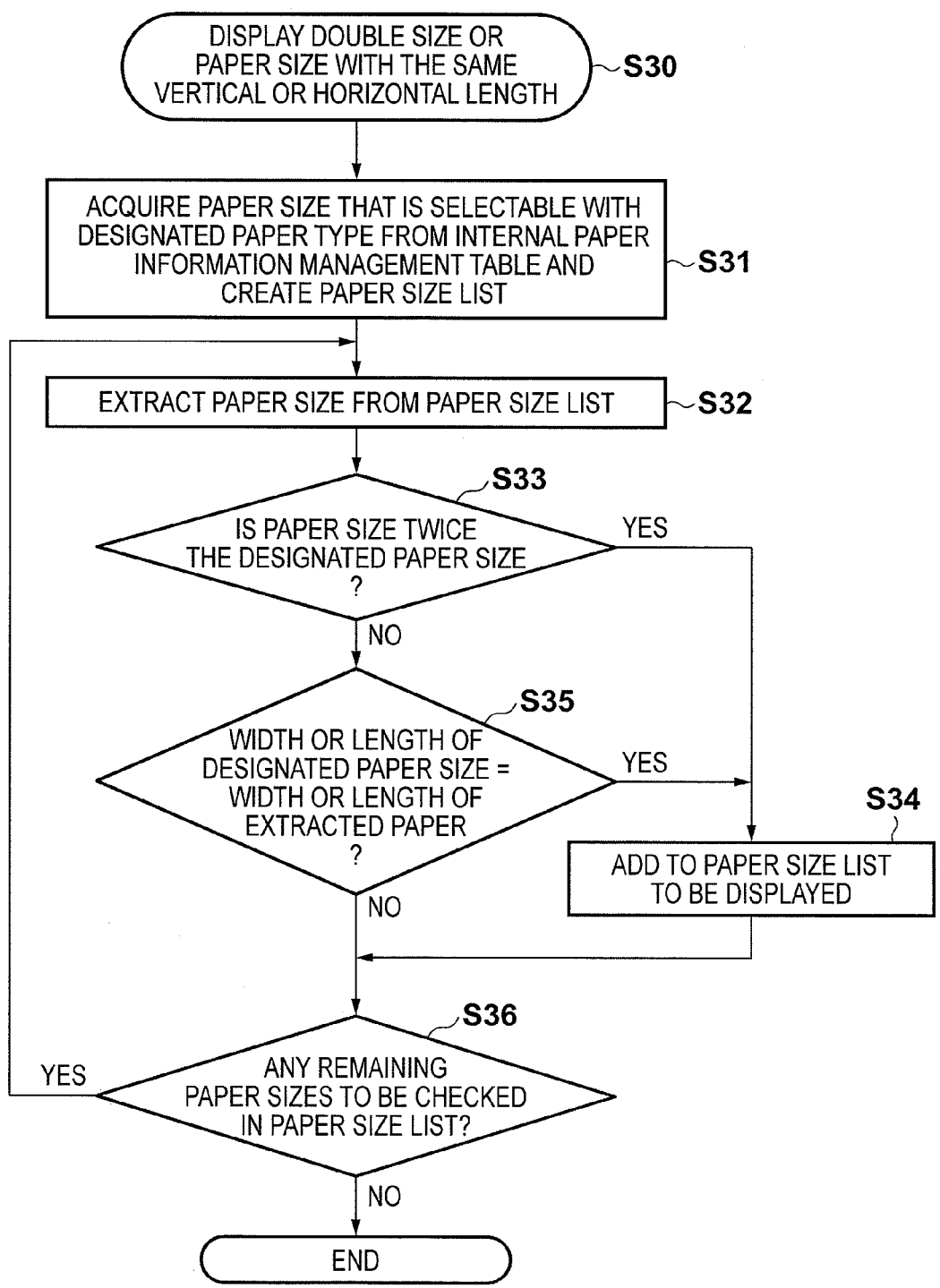
FIG. 21 is a detailed flowchart showing of processing for displaying paper size.

FIG. 21 is a detailed flowchart of the processing for displaying a paper size (step S128).

The processing starts in step S30, and in step S31, a list of paper sizes that use the same paper type as that designated by the job ticket data is created. It is assumed, for example, that five paper information pieces, namely, "A4/normal paper (default)", "A4/thick paper", "A3/normal paper", "B4/thin paper", and "B5/normal paper", are designated. In this case, a list of paper sizes of paper information pieces in which "normal paper" is set includes "A4", "A3", and "B5".

The procedure proceeds to step S32, in which one of the paper sizes is extracted from the paper size list. In step S33, it is determined whether or not the extracted paper size is twice the designated paper size. For example, a size twice the size of "A4" is "A3". If the extracted paper size is twice the designated paper size, the procedure proceeds to step S34, in which the paper size is added to the paper size list as a selection candidate to be displayed.

On the other hand, if the extracted paper size is not twice the designated paper size, the procedure proceeds to step S35, in which it is determined whether or not either the vertical or horizontal length of the paper size designated by the Web application 203 is equal to either the vertical or horizontal length of the paper size extracted in step S32. If either of the lengths is equal, the procedure proceeds to step S34, whereas if none of the lengths are equal, the procedure proceeds to step S36. In step S36, it is determined whether or not there are any remaining paper sizes to be checked in the paper size list created in step S31. If there are any remaining paper sizes, the procedure returns to step S32, and otherwise, the processing ends.

As described above, in Embodiment 3, the client PC limits the selection of paper size and paper type, based on the combination information pieces, each indicating a combination of paper size and paper type, included in the job ticket transmitted from the server PC. In this case, if a paper cutting function is available, paper sizes that are larger than the paper size designated by the job ticket are also set as selectable paper sizes. This eases the limitations on print output settings by a user.

Modification

In Embodiments 1 to 3 described above, a description has been given on the assumption that firstly the Web application 203 carries out settings and secondly the bookbinding application 213 carries out settings. However, there are also cases where a paper information piece is added in the Web application 203 while the bookbinding application 213 is performing editing processing. The following description is given of a case where the bookbinding application 213 that has already been started receives a newly added paper information piece.

Figure 22:
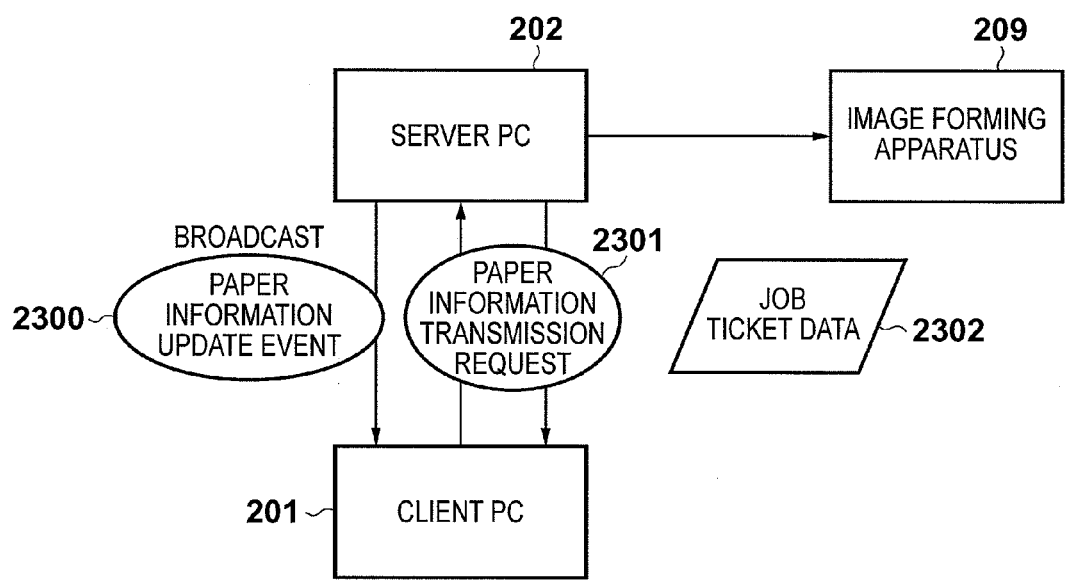
FIG. 22 is a diagram showing a data flow in a bookbinding system according to a modification.

FIG. 22 is a diagram illustrating processing according to the modification. In the case where a new paper information piece is added in the Web application 203, a paper information update event 2300 is broadcast on the network 227. Upon receiving the above paper information update event, the bookbinding application 213 transmits a paper information transmission request event 2301 to the Web application 203. In response, new job ticket data 2302 is sent from the Web application 203. The bookbinding application 213 updates information in the internal paper information management table and the like, based on the received new job ticket data 2302.

Figure 23:
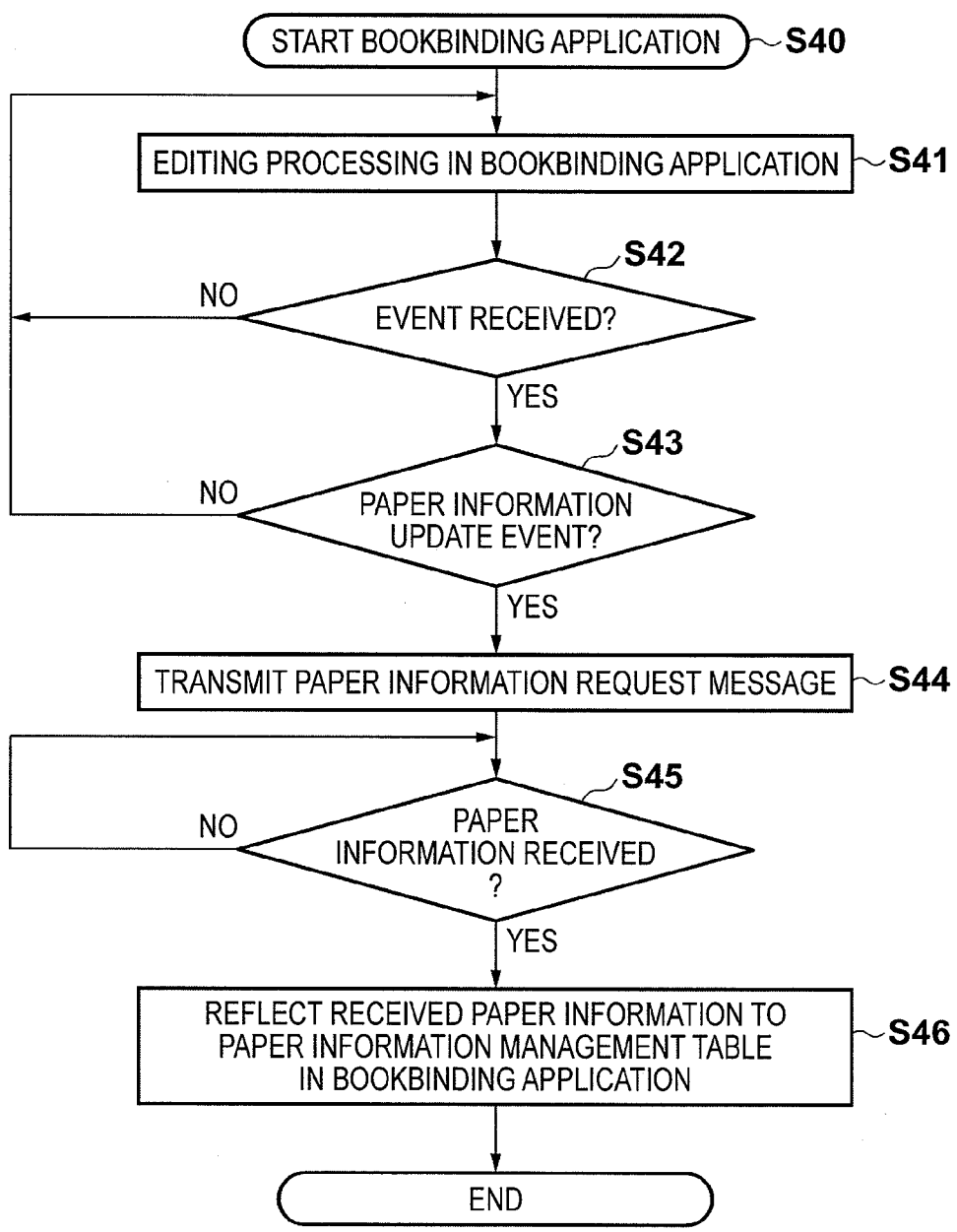
FIG. 23 is a flowchart for describing the modification.

FIG. 23 is a flowchart of operations for describing the modification. In step S40, the bookbinding application 213 is started, and in step S41, the bookbinding application 213 executes editing or setting processing of some kind. In step S42, the bookbinding application 213 determines whether or not an event has been received from the Web application 203. If no event has been received, the procedure returns to step S41. If an event has been received, the procedure proceeds to step S43, in which it is determined whether or not the event is a paper information update event.

If the event is not a paper information update event (NO), the procedure returns to step S41 and continues the processing. If the event is a paper information update event (YES), the procedure proceeds to step S44, in which a message serving as a paper information request event is transmitted from the bookbinding application 213 to the Web application 203. In step S45, the processing waits until job ticket data 2302 is received from the Web application 203, and if the job ticket data has been received, the procedure proceeds to step S46. In step S46, information in the internal paper information management table and the like is updated based on the received new job ticket data.

As described above, in the modification, the client PC is capable of using the most recent paper information available in the server PC.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-255310, filed Nov. 15, 2010, which is hereby incorporated by reference herein in its entirety.

What is claimed is:

1. A client apparatus that receives document data and a job ticket that includes one or more combination information pieces, each including a paper size and a paper type, from a server apparatus, and generates a print job for the document data, the apparatus comprising:
   a size designation unit configured to designate a paper size to be used to print out the document data received from the server apparatus;
   a type designation unit configured to designate a paper type to be used to print out the document data received from the server apparatus; and
   a control unit configured to perform control such that, in a case where designation of a paper size by the size designation unit is performed preceding designation of a paper type by the type designation unit, a combination information piece that includes the paper size designated by the size designation unit is extracted from among the one or more combination information pieces included in the job ticket, and the paper type included in the extracted combination information piece is set as a paper type that is selectable by the type designation unit, and in a case where designation of a paper type by the type designation unit is performed preceding designation of a paper size by the size designation unit, a combination information piece that includes the paper type designated by the type designation unit is extracted from among the one or more combination information pieces included in the job ticket, and the paper size included in the extracted combination information piece is set as a paper size that is selectable by the size designation unit.

2. The client apparatus according to claim 1, further comprising a storage unit configured to store a management table that includes one or more combination information pieces, each including a paper size and a paper type that are designatable by the size designation unit and the type designation unit, the management table being independent of the one or more combination information pieces included in the job ticket,
   wherein in a case where designation of a paper size by the size designation unit is performed preceding designation of a paper type by the type designation unit, the control unit sets a paper type that is common to both a combination information piece of the job ticket that includes the paper size designated by the size designation unit and a combination information piece of the management table that includes the paper size designated by the size designation unit, as a paper type that is selectable by the type designation unit, and
   in a case where designation of a paper type by the type designation unit is performed preceding designation of a paper size by the size designation unit, the control unit sets a paper size that is common to both a combination information piece of the job ticket that includes the paper type designated by the type designation unit and a combination information piece of the management table that includes the paper type designated by the type designation unit, as a paper size that is selectable by the size designation unit.

3. The client apparatus according to claim 1, wherein in a case where the job ticket includes only one combination information piece, the control unit causes the size designation unit to forcibly designate the paper size included in the combination information piece, and causes the type designation unit to forcibly designate the paper type included in the combination information piece.

4. The client apparatus according to claim 1, further configured to receive device information from the server apparatus, the device information including availability of a paper cutting function in a printing device used by the server apparatus to print out document data, and further comprising a determination unit configured to determine whether or not a paper cutting function is available in the printing device, based on the received device information,
   wherein in a case where it is determined that a paper cutting function is available in the printing device, the control unit additionally sets a paper size that is larger than the paper size designated from among the one or more combination information pieces included in the job ticket, as a paper size that is selectable by the size designation unit.

5. A control method for controlling a client apparatus that receives document data and a job ticket that includes one or more combination information pieces, each including a paper size and a paper type, from a server apparatus and generates a print job for the document data, the method comprising:
   selecting and designating, by a processor, a paper size to be used to print out the document data received from the server apparatus;
   selecting and designating, by a processor, a paper type to be used to print out the document data received from the server apparatus; and
   performing control, by a processor, such that, in a case where designation of a paper size is performed preceding designation of a paper type, a combination information piece that includes the designated paper size is extracted from among the one or more combination information pieces included in the job ticket, and the paper type included in the extracted combination information piece is set as a paper type that is selectable, and in a case where designation of a paper type is performed preceding designation of a paper size, a combination information piece that includes the designated paper type is extracted from among the one or more combination information pieces included in the job ticket, and the paper size included in the extracted combination information piece is set as a paper size that is selectable.

6. A non-transitory computer-readable storage medium that stores a program for causing a computer to function as units of the client apparatus according to claim 1.

7. A bookbinding system comprising:
a server apparatus that outputs document data and a job ticket that includes one or more combination information pieces, each including a paper size and a paper type; and
a client apparatus that receives the document data and the job ticket from the server apparatus and generates a print job for the document data,
wherein the client apparatus includes:
- a size designation unit configured to designate a paper size to be used to print out the document data received from the server apparatus;
- a type designation unit configured to designate a paper type to be used to print out the document data received from the server apparatus; and
- a control unit configured to perform control such that, in a case where designation of a paper size by the size designation unit is performed preceding designation of a paper type by the type designation unit, a combination information piece that includes the paper size designated by the size designation unit is extracted from among the one or more combination information pieces included in the job ticket, and the paper type included in the extracted combination information piece is set as a paper type that is selectable by the type designation unit, and in a case where designation of a paper type by the type designation unit is performed preceding designation of a paper size by the size designation unit, a combination information piece that includes the paper type designated by the type designation unit is extracted from among the one or more combination information pieces included in the job ticket, and the paper size included in the extracted combination information piece is set as a paper size that is selectable by the size designation unit.

* * * * *